United States Patent [19]

Bouton

[11] Patent Number: 5,042,860
[45] Date of Patent: Aug. 27, 1991

[54] SUPPORT STICK FOR AN ERODIBLE MATERIAL

[75] Inventor: Jim Bouton, Teaneck, N.J.

[73] Assignee: The Jim Bouton Corporation, Teaneck, N.J.

[21] Appl. No.: 490,196

[22] Filed: Mar. 8, 1990

[51] Int. Cl.⁵ .............................................. A23G 9/26
[52] U.S. Cl. ...................... 294/5.5; 294/1.1; 426/87; 426/104; 426/134; D1/104
[58] Field of Search ........... 294/1.1, 5, 5.5, 15, 294/23.5, 25, 99.2, 87.11, 137, 158; 16/110 R; 40/637; 273/72 R; 426/87, 91, 101, 104, 134, 139, 112; 428/542.2, 542.4; D1/102-106, 114, 116, 199; D7/601, 602, 654, 681, 683, 684, 688, 689; D21/211

[56] References Cited

U.S. PATENT DOCUMENTS

| D. 52,667 | 11/1918 | Maynard | D7/654 X |
|---|---|---|---|
| D. 118,840 | 2/1940 | Texter et al. | D1/104 |
| D. 161,746 | 1/1951 | Gowland | D1/104 |
| D. 185,633 | 7/1959 | Ensler et al. | D1/103 |
| 1,502,006 | 7/1924 | Alvord | 426/104 X |
| 1,668,524 | 5/1928 | Bogue | 426/134 X |
| 2,469,589 | 5/1949 | Barricini | 426/104 |
| 2,821,481 | 1/1958 | Moslo | 294/5.5 |
| 3,469,997 | 9/1969 | Rossi et al. | 426/134 X |
| 4,849,231 | 7/1989 | Spee | 426/134 X |

FOREIGN PATENT DOCUMENTS

| 1042126 | 10/1953 | France | 426/134 |
| 898235 | 6/1962 | United Kingdom | 426/134 |

Primary Examiner—Johnny D. Cherry
Attorney, Agent, or Firm—Blum Kaplan

[57] ABSTRACT

A support stick for an erodible material which provides increased aesthetic and play value is provided. The support stick includes a handle and a support portion. The support stick is embedded within the erodible material and supports the material thereon so that the support portion is embedded in the erodible material and the handle extends from the erodible material. The support stick is formed to have the outline of athletic equipment.

8 Claims, 2 Drawing Sheets

SUPPORT STICK FOR AN ERODIBLE MATERIAL

BACKGROUND OF THE INVENTION

This invention relates in general to a support stick which supports an opaque erodible material and in particular to an ice cream bar or candy support stick that provides new and different play value.

Support sticks for opaque erodible materials, such as lollipops or ice cream bars are well known in the art. These prior art support sticks fall into one of two general categories. The first support stick, generally associated with lollipops and other candy, is formed of tightly wound paper which is embedded within the candy. The second type of support stick is generally associated with ice cream and frozen goods and is formed of a substantially elongated and flat piece of wood or plastic which is embedded into the substance to be eaten.

Both of these prior art support sticks suffer from the disadvantage that they are functional, utilitarian and provide no intrinsic value. Additionally, they provide no entertainment or play value to the overall product. Accordingly, a support stick for an ice cream bar, lollipop or the like which provides enhanced entertainment and intrinsic play value is desired.

SUMMARY OF THE INVENTION

Generally speaking, in accordance with the instant invention, a support stick for an erodible material having improved aesthetic value and play value is provided. The support stick has a support section and a handle, the handle extending from the erodible material. The support stick is formed as a replica of athletic equipment, such as a baseball bat. The support section of the support stick is disposed within the erodible material, so that to appreciate the information being conveyed such as the shape thereof the erodible material must be removed from the support stick so that the support is revealed.

In an exemplary embodiment, the signature of a famous athlete and/or other indicia such as his number, team logo, position or the like is imprinted onto the support section of the support stick embedded within the erodible material.

Accordingly, it is an object of the instant invention to provide an improved support stick for an erodible material.

Another object of the instant invention is to provide a support stick for an erodible material which enhances the aesthetic value of the support stick and erodible material.

A further object of the instant invention is to provide a combination of an erodible material and support stick wherein the support stick provides inherent play value.

Still other objects and advantages of the invention will in part be obvious and in part be apparent from the specification.

The invention accordingly comprises the features of construction, combination of elements, and arrangement of parts which will be exemplified by the constructions hereinafter set forth and the scope of the invention will indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 3:
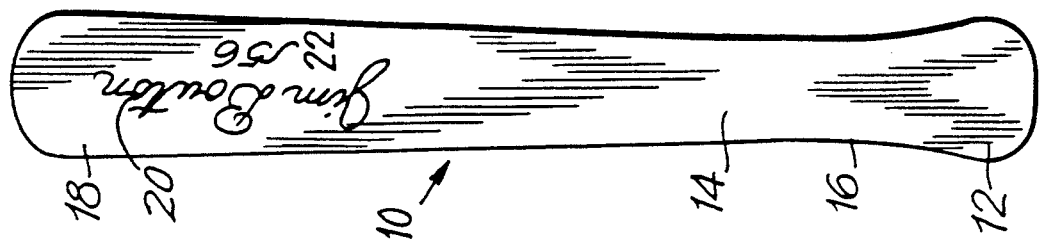
FIG. 3 is a front elevational view of the support stick for an erodible material constructed in accordance with the invention.
Figure 2:
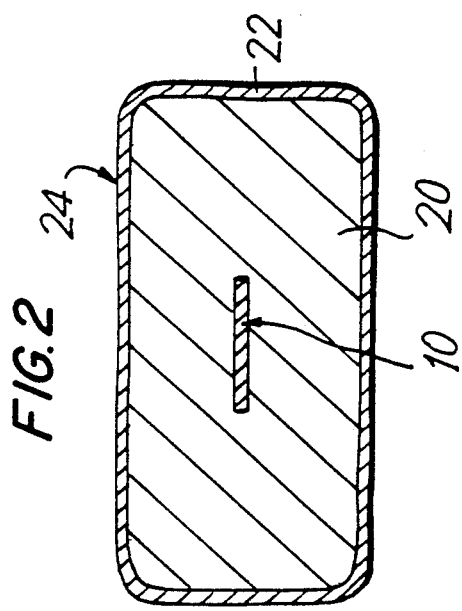
FIG. 2 is a sectional view taken along 2—2 of FIG. 1.
Figure 1:
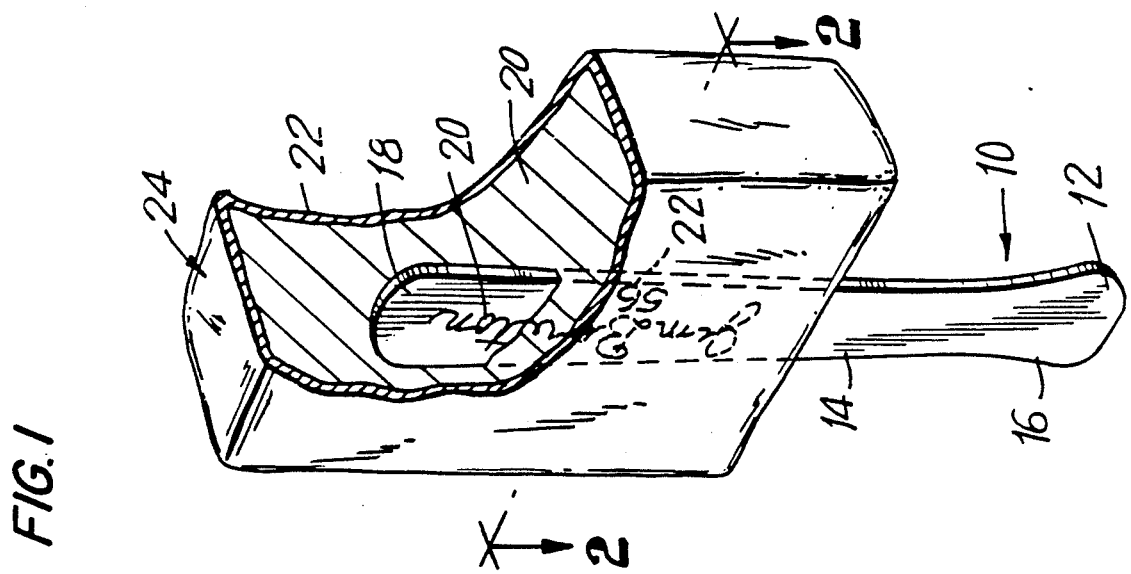
FIG. 1 is a perspective view of the support stick for an erodible material constructed in accordance with the invention supporting a partly eroded material.

Reference is first made to FIGS. 1-3 wherein a support stick for an ice cream bar constructed in accordance with an exemplary embodiment of the instant invention is provided. Support stick 10 has the general silhouette of a baseball bat and includes a knob 12 connected to a handle 14 through a waist 16. Handle 14 extends and expands towards the top of support stick 12 into a barrel 18.

Figure 4:
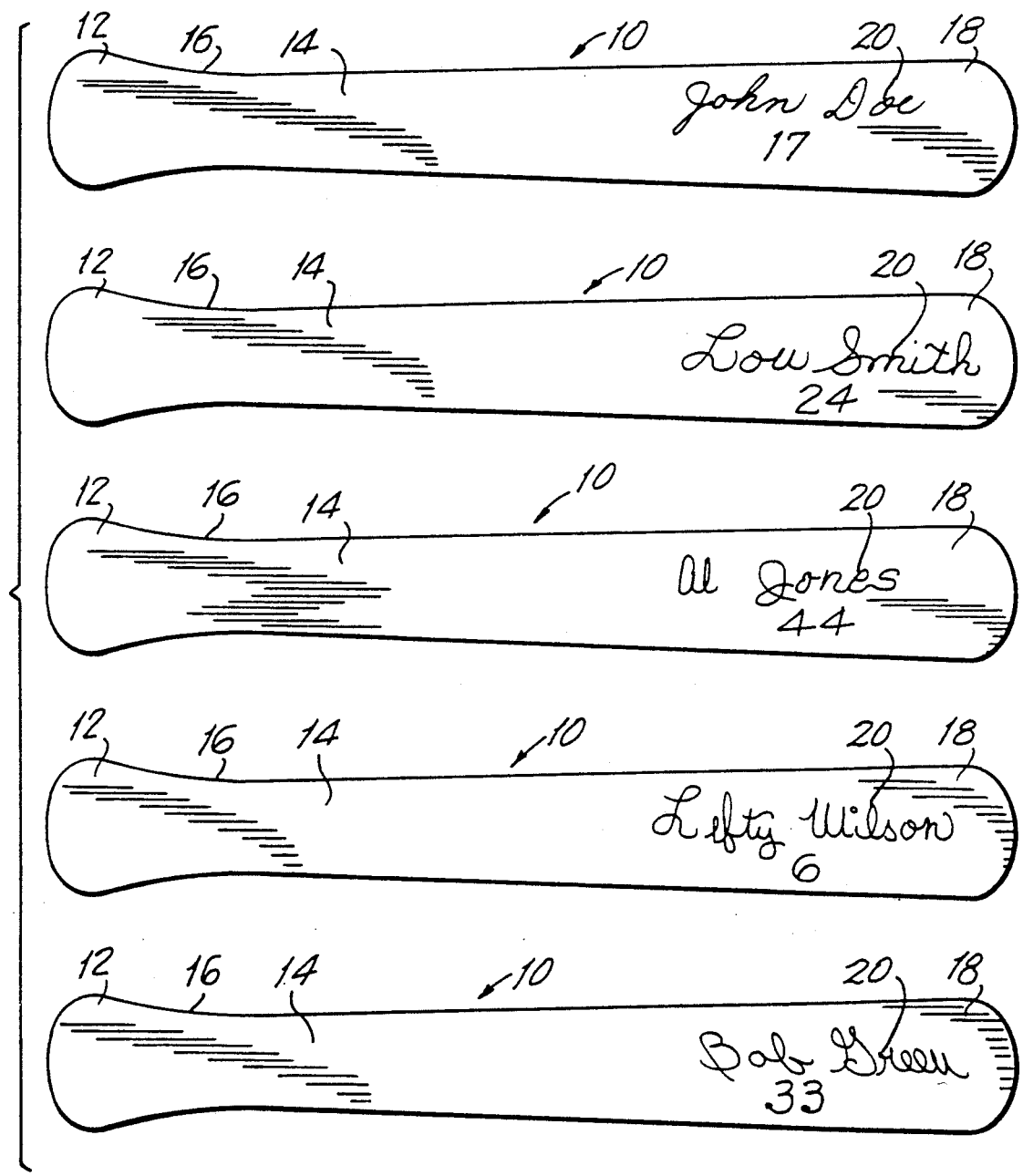
FIG. 4 is a perspective view of a plurality of support sticks constructed in accordance with the invention.

Indicia is provided on barrel 18 and may include a signature 20 of a famous baseball player as well as his playing number 22, or the like. Not only does the provision of a signature 20 differentiate different support sticks from each other as seen in FIG. 4, making the support stick suitable for collection, but enhances the aesthetic value of the support stick 10 and enhances the play value of support stick 10 and increases the realism of support stick 10. This provides support stick 10 with intrinsic play value even after it has been used to support the erodible material.

Reference is now made specifically to FIGS. 1 and 2 wherein operation of support stick 10 is provided. Support stick 10 is embedded at the center of an ice cream bar 24 having an inner ice cream portion 20 and an outer coating 22. Support stick 10 is embedded within ice cream bar 24 so that knob 12 and a portion of handle 14 extend without ice cream bar 24 and a portion of handle 14 and barrel 18 extend within ice cream 20 of ice cream bar 24 so that all of the indicia 20, 22 is covered.

Handle 14 acts not only to improve the aesthetic appearance of a support stick as the handle of a baseball bat, but also provides the actual grip for holding the supporting stick when ice cream bar 24 is eaten. Ice cream bar 24 is an opaque material; therefore, the overall appearance of support stick 10 and the identity of the indicia information such as autograph 20 and number 22 are hidden from the person about to eat ice cream bar 24.

As seen in FIG. 1, as each bite is taken from ice cream 24, more of support stick 10 is exposed, thereby giving clues as to the identity of the autograph 20 located on barrel 18, thus increasing the play value of eating. When ice cream bar 24 is either entirely eaten or melted away, the entire autograph 20, number 22 and other indicia are exposed leaving one with a replica baseball bat which may be collected if desired.

As can be seen from FIG. 2, support stick 10 has a substantially rectangular cross section. This along with the widened barrel 18 allows support stick 10 to support a larger load such as when supporting ice cream bar 24. However, when supporting lighter loads such as a lollipop or other candy, support stick 10 may be formed with a substantially circular cross section or a less exaggerated barrel 18.

Ice cream has been used by way of example for the erodible material. However, any opaque material which hides the identity of the autograph such as candy, erodible or meltable plastics or the like may be utilized. When less opaque material is utilized, play value is reduced though the aesthetic and collectible quality of the support stick are not diminished. Additionally, a support stick formed as a baseball bat is provided by way of example. However, any athletic equipment which lends itself to a handle and an area which may be inscribed upon and embedded within an opaque material while supporting the opaque material is also useable. For example, it is contemplated that a tennis racquet having the tennis head extending within the erodible material, a hockey goalie's stick, or the like are equally applicable as a support stick for an erodible material which increases both aesthetic value and play value.

By providing a support stick for an erodible material formed as a piece of athletic equipment, having a handle extending from the erodible material and a portion extending within the material for supporting the material thereon, an improved support stick providing increased aesthetic and play value is provided. By providing indicia such as an athlete's autograph, number or the like on the embedded portion of the support stick, play value and aesthetic value are enhanced even more.

It will thus be seen that the objects set forth above, among those made apparent from the preceding description, are efficiently attained and, since certain changes may be made in the above construction without departing from the spirit and the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A support stick for an erodible material comprising a handle and a support portion, said support stick being disposed within said erodible material so that said support portion is embedded within said erodible material and said handle extends from said erodible material, said support stick having a shape representative of an item of athletic equipment and indicia means providing information on said support stick of an athletic content so that the theme of the shape of the support stick is a theme common with the theme of the information provided by said indicia means.

2. The support stick of claim 1, wherein the shape of said support stick forms the outline of a baseball bat.

3. The support stick of claim 1, wherein said indicia means is located on said support stick so that said indicia means is embedded in said erodible material.

4. The support stick of claim 1, wherein said support stick has the outline of a baseball bat including a barrel, said indicia means being located on said barrel.

5. The support stick of claim 1, wherein said information includes the autograph signature of an athlete.

6. The support stick of claim 1, wherein said information includes the autograph signature of an athlete.

7. The support stick of claim 1, wherein said support stick is one of a plurality of support sticks, each of said plurality of said support sticks including said indicia means, the indicia means of at least two of said support sticks providing non-identical information whereby said at least two support sticks are provided with a respective independent aesthetic value.

8. A support stick for an ice cream bar comprising a handle and support portion, said support stick being disposed within said ice cream bar so that said support portion is embedded within said ice cream bar and said handle extends from said ice cream bar, said support stick having a shape representative of an item of athletic equipment and indicia means located on said support portion providing information on said support stick, said indicia means being covered by said ice cream bar and said indicia means providing information of an athletic content, so that the theme of the shape of the support stick is a theme common with the theme of the information provided by said indicia means.

* * * * *